US012025587B2

United States Patent
Amjadian et al.

(10) Patent No.: US 12,025,587 B2
(45) Date of Patent: Jul. 2, 2024

(54) SUPER-RESOLUTION PHOTOACOUSTIC MICROSCOPY

(71) Applicants: Mohammadreza Amjadian, Tehran (IR); Seyed Masood Mostafavi, Tehran (IR); Zahra Kavehvash, Tehran (IR)

(72) Inventors: Mohammadreza Amjadian, Tehran (IR); Seyed Masood Mostafavi, Tehran (IR); Zahra Kavehvash, Tehran (IR)

( * ) Notice: Subject to any disclaimer, the term of this patent is extended or adjusted under 35 U.S.C. 154(b) by 187 days.

(21) Appl. No.: 17/882,542

(22) Filed: Aug. 6, 2022

(65) Prior Publication Data

US 2022/0381745 A1 Dec. 1, 2022

Related U.S. Application Data

(60) Provisional application No. 63/230,841, filed on Aug. 9, 2021.

(51) Int. Cl.
*G01N 29/24* (2006.01)
*G01N 29/04* (2006.01)
(Continued)

(52) U.S. Cl.
CPC ......... *G01N 29/2418* (2013.01); *G01N 29/04* (2013.01); *G01N 29/46* (2013.01); *G02B 26/06* (2013.01); *G02B 26/0833* (2013.01); *G02B 26/101* (2013.01); *G02B 27/0955* (2013.01); *G02B 27/1066* (2013.01); *G01N 2291/023* (2013.01)

(58) Field of Classification Search
CPC .... G01N 29/2418; G01N 29/04; G01N 29/46; G01N 2291/023; G01N 29/043; G01N 29/42; G01N 2291/012; G01N 29/0681; G02B 26/06; G02B 26/0833; G02B 26/101; G02B 27/0955; G02B 27/1066
See application file for complete search history.

(56) References Cited

U.S. PATENT DOCUMENTS 5,585,921 A * 12/1996 Pepper ................. G01N 29/075
356/432
10,036,735 B2 * 7/2018 Piestun ............... G01N 29/2418
(Continued)

FOREIGN PATENT DOCUMENTS

| CN | 110221421 A | * | 9/2019 | ............. G01N 21/01 |
|---|---|---|---|---|
| CN | 112859315 A | * | 5/2021 | |
| JP | 2011083531 A | * | 4/2011 | ........... A61B 5/0059 |

*Primary Examiner* — Collin X Beatty
(74) *Attorney, Agent, or Firm* — Bajwa IP Law Firm; Haris Zaheer Bajwa

(57) ABSTRACT

A method for super-resolution photoacoustic microscopy of an object. The method includes optically exciting the object according to a plurality of excitation patterns utilizing a digital micromirror device (DMD), receiving a plurality of acoustic waves propagated from the object due to optically exciting the object, reconstructing each of a plurality of photoacoustic (PA) images from a respective acoustic wave of the plurality of acoustic waves, and obtaining a super-resolution PA image of the object from the plurality of PA images by applying a frequency domain reconstruction method to the plurality of PA images. Each of the plurality of acoustic waves are associated with a respective excitation pattern of the plurality of excitation patterns.

16 Claims, 18 Drawing Sheets

(51) Int. Cl.
    *G01N 29/46*     (2006.01)
    *G02B 26/06*     (2006.01)
    *G02B 26/08*     (2006.01)
    *G02B 26/10*     (2006.01)
    *G02B 27/09*     (2006.01)
    *G02B 27/10*     (2006.01)

(56) References Cited

U.S. PATENT DOCUMENTS

| | | | |
|---|---|---|---|
| 11,137,375 B2* | 10/2021 | Wang | G02B 21/002 |
| 2012/0070817 A1* | 3/2012 | Wang | G01N 21/49 |
| | | | 435/286.1 |
| 2016/0095520 A1* | 4/2016 | Zhang | A61B 5/7253 |
| | | | 600/407 |
| 2016/0356746 A1* | 12/2016 | Piestun | G01N 29/0654 |
| 2017/0254784 A1* | 9/2017 | Murayama | G01N 29/0681 |
| 2019/0307334 A1* | 10/2019 | Wang | A61B 5/0095 |
| 2020/0340953 A1* | 10/2020 | Koek | G03F 7/70633 |
| 2021/0379670 A1* | 12/2021 | Leard | B22F 12/90 |
| 2021/0382013 A1* | 12/2021 | Leard | G01B 11/161 |

* cited by examiner

904

906

SUPER-RESOLUTION PHOTOACOUSTIC MICROSCOPY

CROSS-REFERENCE TO RELATED APPLICATION

This application takes priority from U.S. Provisional Patent Application Ser. No. 63/230,841 filed on Aug. 9, 2021, and entitled "SUPER-RESOLUTION PHOTOACOSUTIC MICROSCOPY TO BEYOND DIFFRACTION LIMIT", which is incorporated herein by reference in its entirety.

TECHNICAL FIELD

The present disclosure generally relates to imaging systems, and particularly, to photoacoustic microscopy systems.

BACKGROUND

Photoacoustic imaging modality has emerged as a new era of biomedical imaging which comprises a good balance between contrast, resolution, and penetration depth. Using a laser as an illumination source and an ultrasonic transducer as a receiver, both penetration depth and image contrast may be improved compared to ultrasonic or optical imaging systems. In a photoacoustic microscopy (PAM) regime, acoustic waves or an optical beam may be focused on a surface of an object utilizing an acoustic or an optical lens, respectively, with a high numerical aperture (NA). However, due to an inverse proportionality of depth-of-focus (DOF) and NA, a resultant lateral resolution and signal-to-noise ratio (SNR) in out-of-focus regions may be severely degraded. There is, therefore, a need for a method that may achieve improved and uniform lateral resolution in both focus and out-of-focus regions. There is also a need for a method that may afford depth-invariant lateral resolution in both focus and out-of-focus regions so that high-quality volumetric imaging may be provided.

SUMMARY

This summary is intended to provide an overview of the subject matter of this patent, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure describes an exemplary for super-resolution photoacoustic microscopy imaging of an object. An exemplary method may include optically exciting the object according to a plurality of excitation patterns utilizing a digital micromirror device (DMD), receiving a plurality of acoustic waves propagated from the object due to optically exciting the object, reconstructing each of a plurality of photoacoustic (PA) images from a respective acoustic wave of the plurality of acoustic waves, and obtaining a super-resolution PA image of the object from the plurality of PA images by applying a frequency domain reconstruction method to the plurality of PA images. In an exemplary embodiment, each of the plurality of acoustic waves may be associated with a respective excitation pattern of the plurality of excitation patterns.

In an exemplary embodiment, optically exciting the object may include emitting a laser beam to the DMD, generating a plurality of modulated light beams from the laser beam by producing a plurality of periodic square patterns (PSPs) via the DMD, generating a plurality of sinusoidal spatial fringe (SSF) patterns from the plurality of PSPs by filtering the plurality of modulated light beams, and exciting the object by emitting each of the plurality of SSF patterns to the object. In an exemplary embodiment, each of the plurality of PSPs may be associated with a respective excitation pattern of the plurality of excitation patterns and may include a respective orientation of a plurality of orientations and a respective phase shift of a plurality of phase shifts. In an exemplary embodiment, optically exciting the object may further include reflecting the laser beam to the object by the DMD.

In an exemplary embodiment, emitting the laser beam to the DMD may include generating the laser beam by a laser, reflecting the laser beam to a beam expander by a first mirror, generating an expanded laser beam from the laser beam by expanding a width of the laser beam utilizing the beam expander, and reflecting the expanded laser beam to the DMD by a second mirror.

In an exemplary embodiment, expanding the width of the laser beam may include converging the laser beam at a first focal point of a first optical lens and collimating a diverging light beam from the first focal point by placing a second focal point of a second optical lens at the first focal point.

In an exemplary embodiment, producing the plurality of PSPs may include producing each of the plurality of PSPs at a respective orientation of the plurality of orientations and a respective phase shift of the plurality of phase shifts. In an exemplary embodiment, producing each of the plurality of PSPs at a respective orientation of the plurality of orientations may include setting each of the plurality of orientations to one of 0, $\pi/4$, $\pi/2$, and $3\pi/4$. In an exemplary embodiment, producing each of the plurality of PSPs at a respective phase shift of the plurality of phase shifts may include shifting each of the plurality of PSPs on the DMD by a phase shift equal to one of 0, $\pi/2$, and $\pi$.

In an exemplary embodiment, filtering the plurality of modulated light beams may include converging the plurality of modulated light beams at a third focal point of a third optical lens, filtering high-order spatial frequencies of the plurality of modulated light beams by passing the plurality of modulated light beams through a pinhole, and collimating a plurality of diverging light beams from the third focal point by placing a fourth focal point of a fourth optical lens at the third focal point. An exemplary pinhole may be placed at the third focal point. In an exemplary embodiment, collimating the plurality of diverging light beams may include reflecting the plurality of diverging light beams to the fourth optical lens by a third mirror.

In an exemplary embodiment, applying the frequency domain reconstruction method may include obtaining a plurality of filtered PA images by low-pass filtering each of the plurality of PA images, obtaining a plurality of down-shifted components from the plurality of filtered PA images by applying a phase compounding method to the plurality of filtered PA images, extracting a plurality of high-frequency components from the plurality of down-shifted components by high-pass filtering the plurality of down-shifted components, and generating the super-resolution PA image by applying an inverse Fourier transform to the plurality of high-frequency components. In an exemplary embodiment, each of the plurality of down-shifted components may be associated with a respective orientation of the plurality of orientations.

In an exemplary embodiment, low-pass filtering each of the plurality of PA images may include passing each of the plurality of PA images through a low-pass filter. In an exemplary embodiment, high-pass filtering the plurality of down-shifted components may include passing the plurality of down-shifted components through a high-pass filter.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein are disclosed an exemplary method for super-resolution photoacoustic microscopy. An exemplary method may generate sinusoidal spatial fringe patterns (SSFs) by emitting laser beams to a digital micromirror device (DMD). An exemplary DMD may be programmed to produce SSFs at several different orientations and phase shifts. Exemplary SSFs may be emitted to a target object. Exemplary acoustic waves may be generated at the target object due to optically exciting the object by the SSFs. The exemplary acoustic waves may be received by an ultrasound transducer (UST). Exemplary photoacoustic (PA) images may then be reconstructed from each acoustic wave received by the UST. Through optical excitation of the targeted object with exemplary SSF patterns, the object's frequency spectrum may shift in the spatial frequency domain. An exemplary down-shifted component may be extracted from the object's frequency spectrum by combining different PA images that correspond to different phase shifts. An exemplary frequency shifting may lead to the passage of high-frequency contents of the object through the passband of an acoustic diffraction frequency response of the UST. Low-frequency and high-frequency images that are captured at different orientations may then be combined as a wide-band image through a phase compounding method. As a result, an exemplary super-resolution image with an enhanced lateral resolution may be obtained.

Figure 1A:
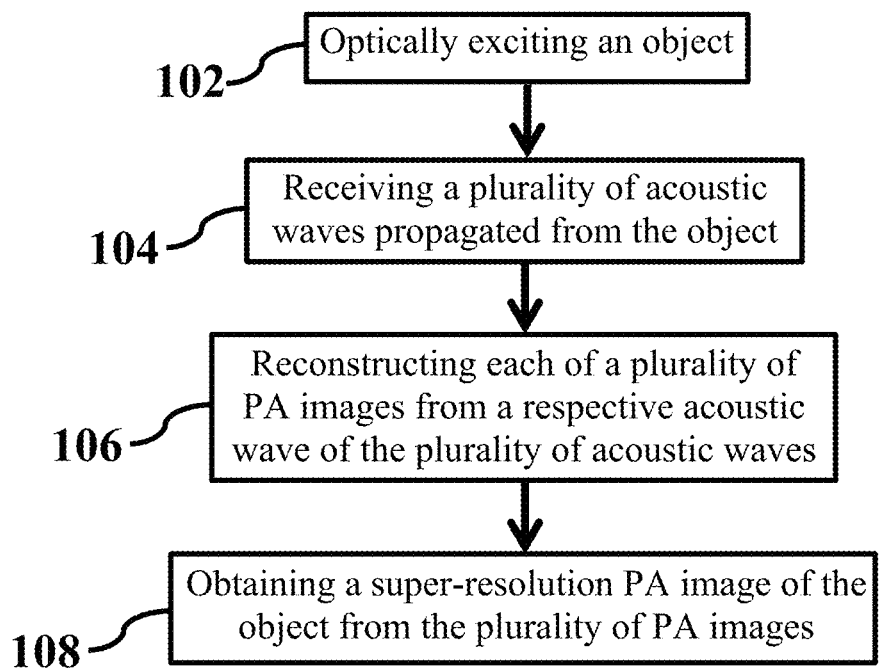
FIG. 1A shows a flowchart of a method for super-resolution photoacoustic microscopy of an object, consistent with one or more exemplary embodiments of the present disclosure.

FIG. 1A shows a flowchart of a method for super-resolution photoacoustic microscopy of an object, consistent with one or more exemplary embodiments of the present disclosure. An exemplary method 100 may include optically exciting the object according to a plurality of excitation patterns utilizing a DMD (step 102), receiving a plurality of acoustic waves propagated from the object due to optically exciting the object (step 104), reconstructing each of a plurality of PA images from a respective acoustic wave of the plurality of acoustic waves (step 106), and obtaining a super-resolution PA image of the object from the plurality of PA images by applying a frequency domain reconstruction method to the plurality of PA images (step 108).

Figure 2:
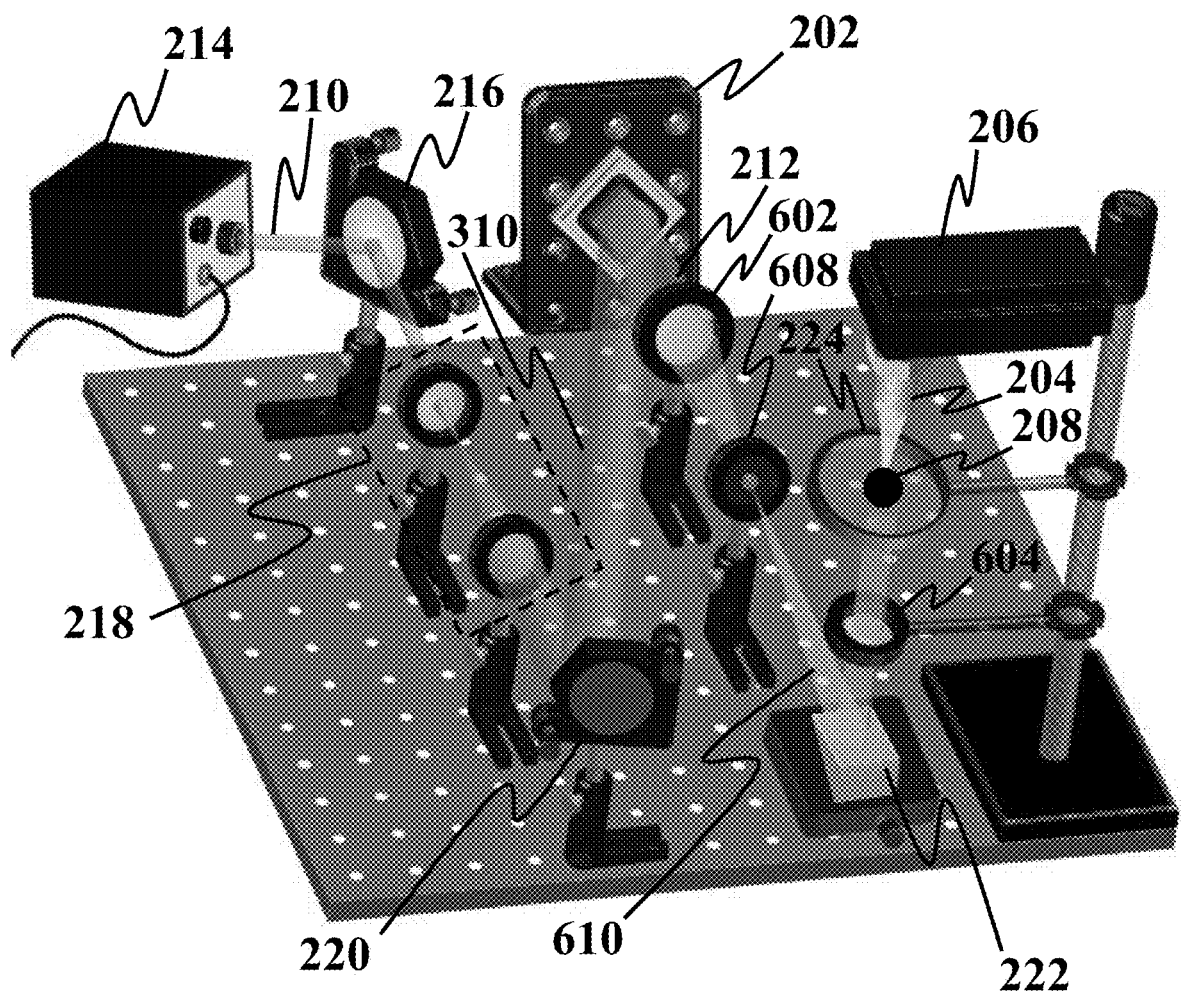
FIG. 2 shows a block diagram of a system for super-resolution photoacoustic microscopy imaging of an object, consistent with one or more exemplary embodiments of the present disclosure.

FIG. 2 shows a block diagram of a system for super-resolution photoacoustic microscopy imaging of an object, consistent with one or more exemplary embodiments of the present disclosure. An exemplary system 200 may include a DMD 202, a UST 204, and a processor 206. In an exemplary embodiment, different steps of method 100 may be implemented utilizing system 200.

Figure 1B:
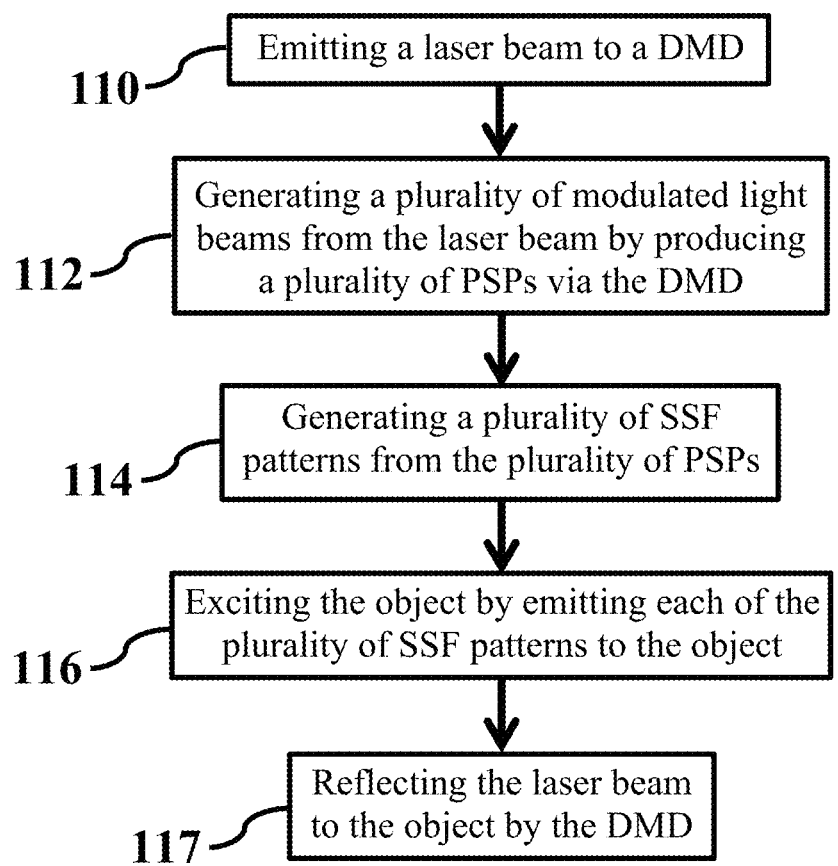
FIG. 1B shows a flowchart for optically exciting an object, consistent with one or more exemplary embodiments of the present disclosure.

In further detail regarding step 102, FIG. 1B shows a flowchart for optically exciting an object, consistent with one or more exemplary embodiments of the present disclosure. Referring to FIGS. 1B and 2, in an exemplary embodiment, optically exciting an object 208 in step 102 may include emitting a laser beam 210 to DMD 202 (step 110), generating a plurality of modulated light beams 212 from laser beam 210 by producing a plurality of periodic square patterns (PSPs) via DMD 202 (step 112), generating a plurality of sinusoidal spatial fringe (SSF) patterns from the plurality of PSPs by filtering plurality of modulated light beams 212 (step 114), and exciting object 208 by emitting each of the plurality of SSF patterns to object 208 (step 116). In an exemplary embodiment, optically exciting object 208 may further include reflecting laser beam 210 to object 208 by DMD 202 (step 117).

Figure 1C:
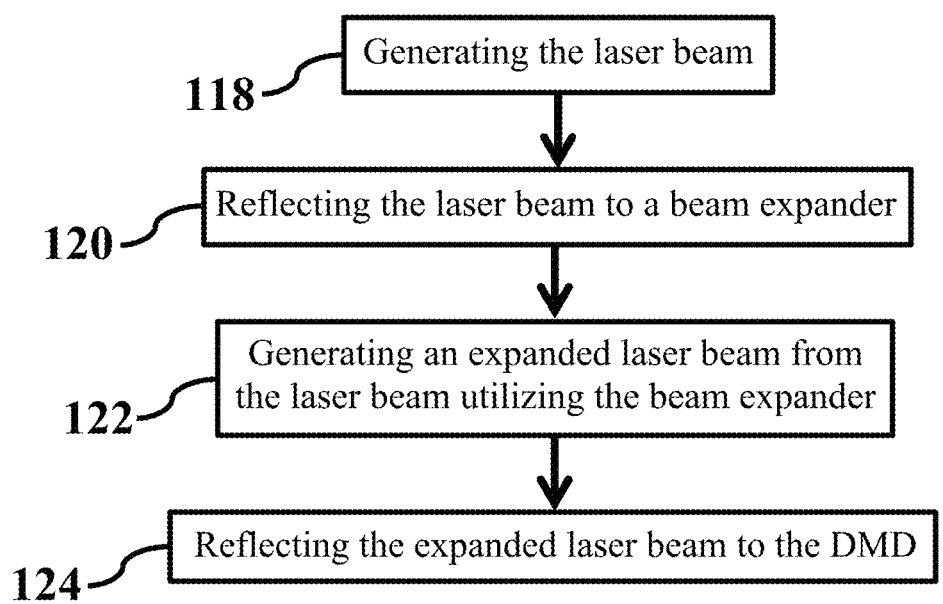
FIG. 1C shows a flowchart for emitting a laser beam to a digital micromirror device (DMD), consistent with one or more exemplary embodiments of the present disclosure.

For further detail with respect to step 110, FIG. 1C shows a flowchart for emitting a laser beam to a DMD, consistent with one or more exemplary embodiments of the present disclosure. In an exemplary embodiment, emitting laser beam 210 to DMD 202 in step 110 may include generating laser beam 210 by a laser (step 118), reflecting laser beam 210 to a beam expander by a first mirror (step 120), generating an expanded laser beam from laser beam 210 by expanding a width of laser beam 210 utilizing the beam expander (step 122), and reflecting the expanded laser beam to DMD 202 by a second mirror (step 124).

Referring to FIGS. 1C and 2, in an exemplary embodiment, system 200 may further include a laser 214. In an exemplary embodiment, laser 214 may include a pulsed laser source that may produce a pulsed laser beam with a given wavelength (for example, about 532 nm), a given pulse repetition rate (for example, about 1 kHz), and a given pulse duration (for example, about 5 ns). In an exemplary embodiment, laser 214 may emit laser beam 210 in step 118. Using laser 214 as an illumination source may enhance penetration depth and image contrast compared to conventional optical imaging systems.

In an exemplary embodiment, system 200 may further include a first mirror 216 and a beam expander 218. In an exemplary embodiment, first mirror 216 may reflect laser beam 210 to beam expander 218 in step 120. Using first mirror 216 may allow for reflecting laser beam 210 to beam expander 218 in a perpendicular direction to improve imaging quality.

Figure 1D:
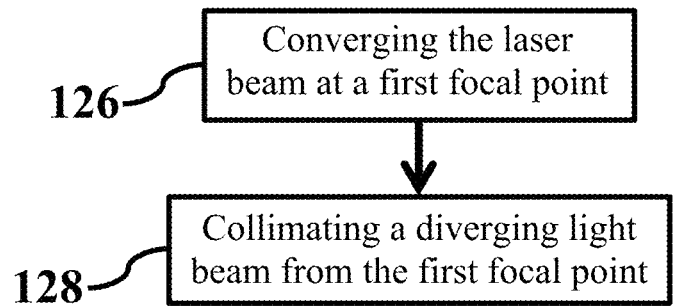
FIG. 1D shows a flowchart for expanding a width of a laser beam, consistent with one or more exemplary embodiments of the present disclosure.

In further detail regarding step 122, FIG. 1D shows a flowchart for expanding a width of a laser beam, consistent with one or more exemplary embodiments of the present disclosure. In an exemplary embodiment, expanding the width of laser beam 210 may include converging laser beam 210 at a first focal point of a first optical lens (step 126) and collimating a diverging light beam from the first focal point by placing a second focal point of a second optical lens at the first focal point (step 128).

Figure 3:
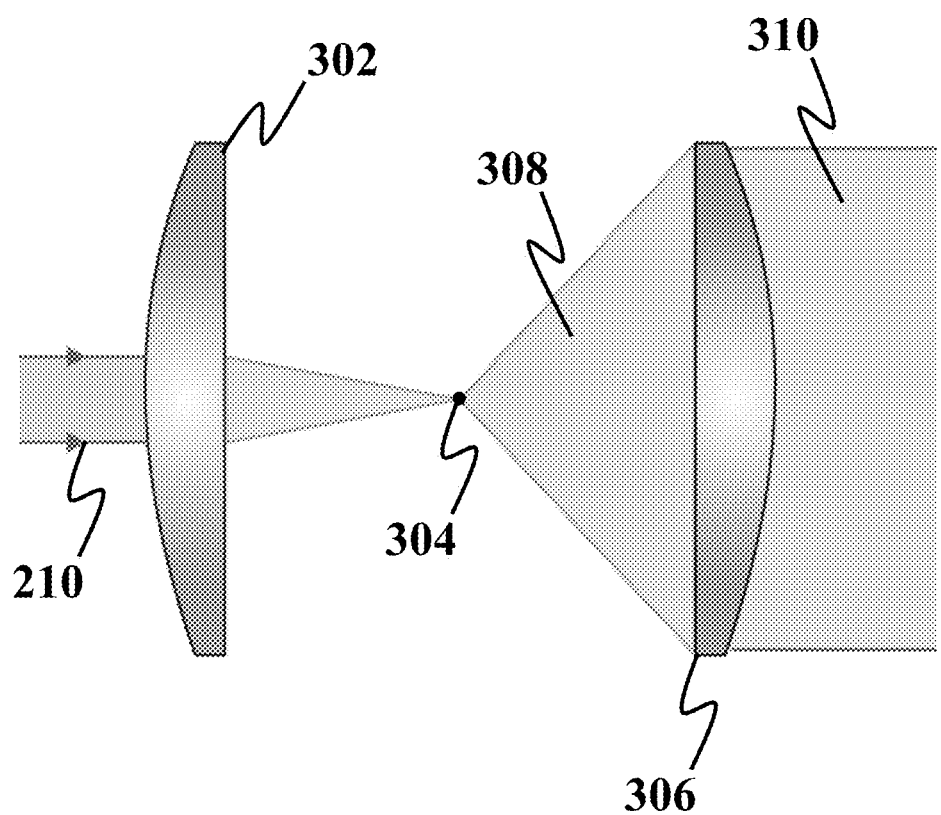
FIG. 3 shows a schematic of a beam expander, consistent with one or more exemplary embodiments of the present disclosure.

In further detail regarding step 126, FIG. 3 shows a schematic of a beam expander, consistent with one or more exemplary embodiments of the present disclosure. In an exemplary embodiment, beam expander 218 may include a first optical lens 302. In an exemplary embodiment, first optical lens 302 may converge laser beam 210 at a first focal point 304 of first optical lens 302 in step 126.

In an exemplary embodiment, beam expander 218 may further include a second optical lens 306. In an exemplary embodiment, second optical lens 306 may collimate a diverging light beam 308 from first focal point 304. For this purpose, an exemplary second focal point of second optical lens 306 may be placed at first focal point 304 in step 128 so that diverging light beam 308 may be emitted to second optical lens 306 from the second focal point. As a result, in an exemplary embodiment, laser beam 210 may be converted to an expanded laser beam 310 which has a larger width compared to laser beam 210.

Referring again to FIGS. 1C and 2, in an exemplary embodiment, system 200 may further include a second mirror 220. In an exemplary embodiment, second mirror 220 may reflect expanded laser beam 310 to DMD 202 in step 120. Using second mirror 220 may increase the precision of beam steering towards DMD 202 so that imaging quality may be enhanced.

Referring again to FIG. 1B, in an exemplary embodiment, step 112 may include producing the plurality of PSPs via DMD 202. In an exemplary embodiment, each of the plurality of PSPs may be produced according to a respective excitation pattern of the plurality of excitation patterns. An exemplary excitation pattern may include an orientation and a phase shift. Therefore, an exemplary excitation pattern may be set to a specific pattern by setting a corresponding orientation and a corresponding phase shift to a specific orientation and a specific phase shift, respectively, as described below. In an exemplary embodiment, each of the plurality of PSPs may be produced at a respective orientation of the plurality of orientations and a respective phase shift of the plurality of phase shifts.

Figure 4:
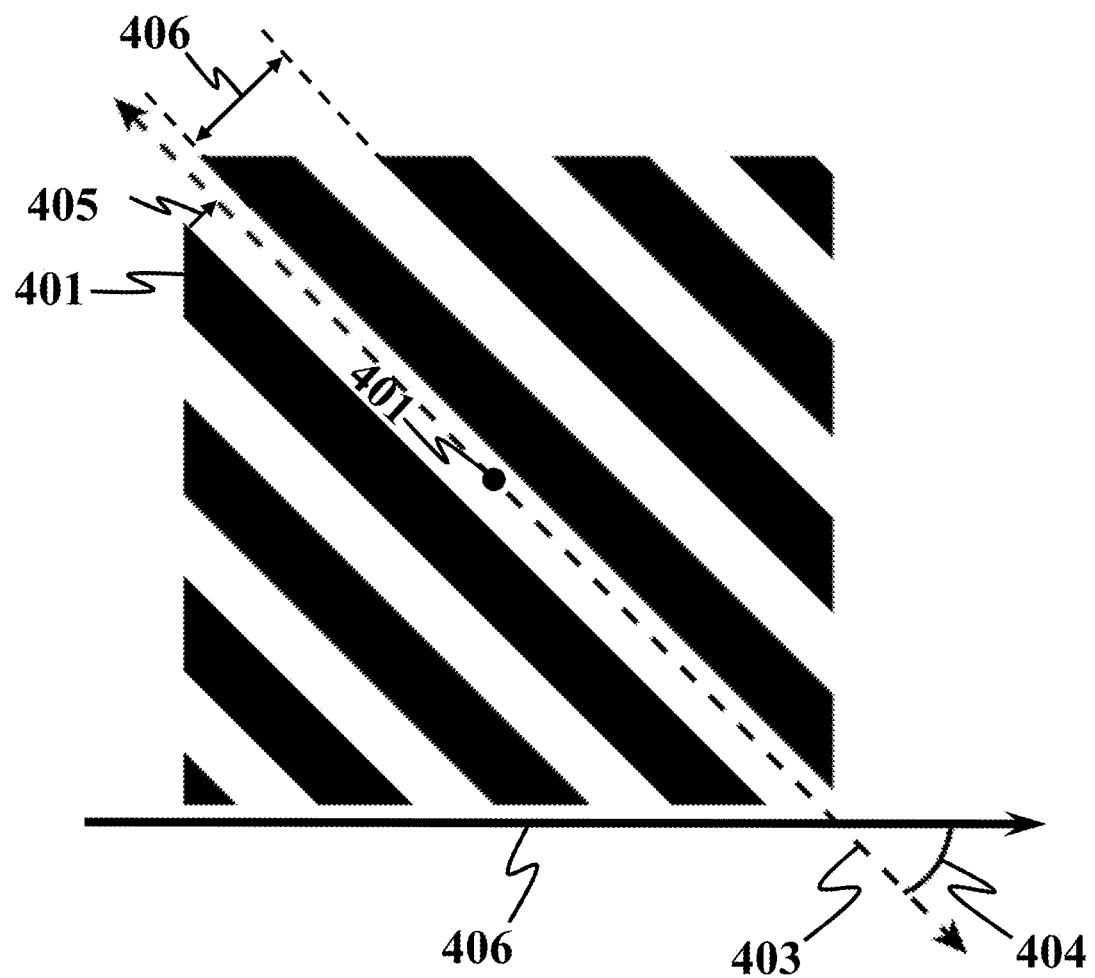
FIG. 4 shows a periodic square pattern (PSP), consistent with one or more exemplary embodiments of the present disclosure.

FIG. 4 shows a PSP, consistent with one or more exemplary embodiments of the present disclosure. An exemplary PSP 400 may include a sequence of parallel fringes (for example, a fringe 401), i.e., alternating bright and dark bands. In an exemplary embodiment, each fringe in the sequence of parallel fringes may be parallel with a main axis 403 of PSP 400. In an exemplary embodiment, main axis 403 may pass through a center 401 of PSP 400. In an exemplary embodiment, PSP 400 may be produced via DMD 202 at an orientation 404 and a phase shift 405. In an exemplary embodiment, orientation 404 may refer to an angle θ between main axis 403 and a horizontal axis 406 of the PSP 400 plane. Exemplary patterns (i.e., each of dark or bright fringes) may be repeated in PSP 400 at a spatial frequency 406. In an exemplary embodiment, orientation 404 may be set to one of 0, π/4, π/2, and 3π/4. In an exemplary embodiment, producing PSP 400 at phase shift 405 may include shifting PSP 400 on DMD 202 by a phase shift equal to one of 0, π/2, and π.

Figure 5:
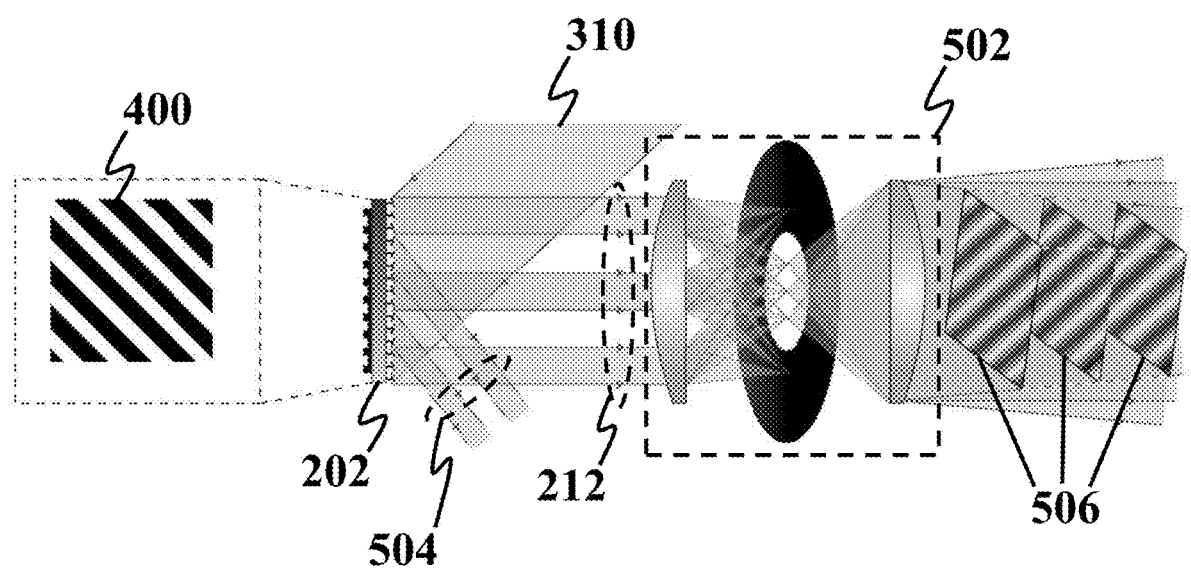
FIG. 5 shows a schematic of a setup for fringe illumination, consistent with one or more exemplary embodiments of the present disclosure.

In further detail with respect to producing PSP 400 may be produced via DMD 202, FIG. 5 shows a schematic of a setup for fringe illumination, consistent with one or more exemplary embodiments of the present disclosure. An exemplary setup 500 may include DMD 202 and an optical filter 502. In an exemplary embodiment, DMD 202 may include several tiny switchable mirrors with two stable mirror states (about +12 degrees and −12 degrees). When an exemplary micromirror is set at about +12 degrees toward an illumination of expanded laser beam 310 (i.e., an "on state"), an exemplary micromirror may reflect the illumination (i.e., a modulated light beam of plurality of modulated light beams 212) to optical filter 502. Therefore, in an exemplary embodiment, plurality of modulated light beams 212 may include bright segments of PSP 400. When an exemplary micromirror is set at about −12 degrees toward an illumination of expanded laser beam 310 (i.e., an "off state"), an exemplary micromirror may reflect the illumination away from 4f correlator 502. As a result, an exemplary reflection 504 may include dark segments of PSP 400 that may not reach optical filter 502.

Figure 1E:
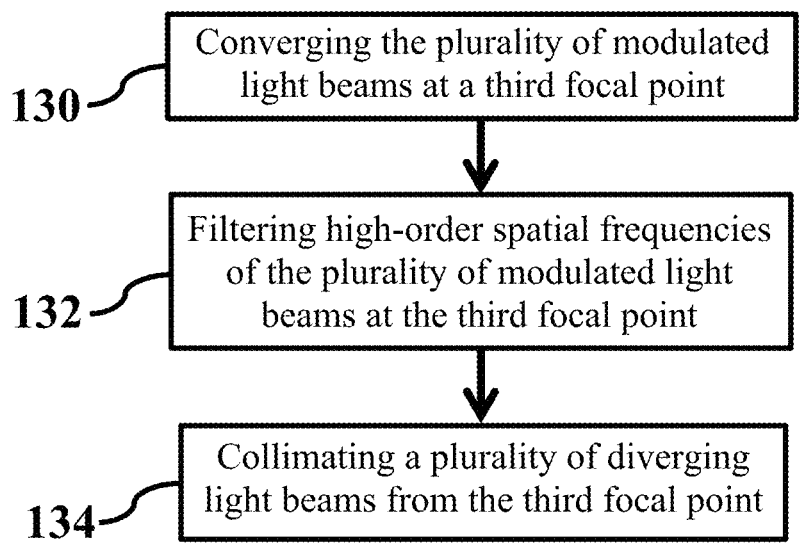
FIG. 1E shows a flowchart for filtering a plurality of modulated light beams, consistent with one or more exemplary embodiments of the present disclosure.

Referring again to FIGS. 1B and 5, in an exemplary embodiment, step 114 may include generating a plurality of SSF patterns 506 by filtering plurality of modulated light beams 212. FIG. 1E shows a flowchart for filtering a plurality of modulated light beams, consistent with one or more exemplary embodiments of the present disclosure. In an exemplary embodiment, filtering plurality of modulated light beams 212 in step 114 may include converging plurality of modulated light beams 212 at a third focal point of a third optical lens (step 130), filtering high-order spatial frequencies of plurality of modulated light beams 212 by passing plurality of modulated light beams 212 through a pinhole (step 132), and collimating a plurality of diverging light beams 610 from a third focal point by placing a fourth focal point of a fourth optical lens at the third focal point (step 134).

Figure 6:
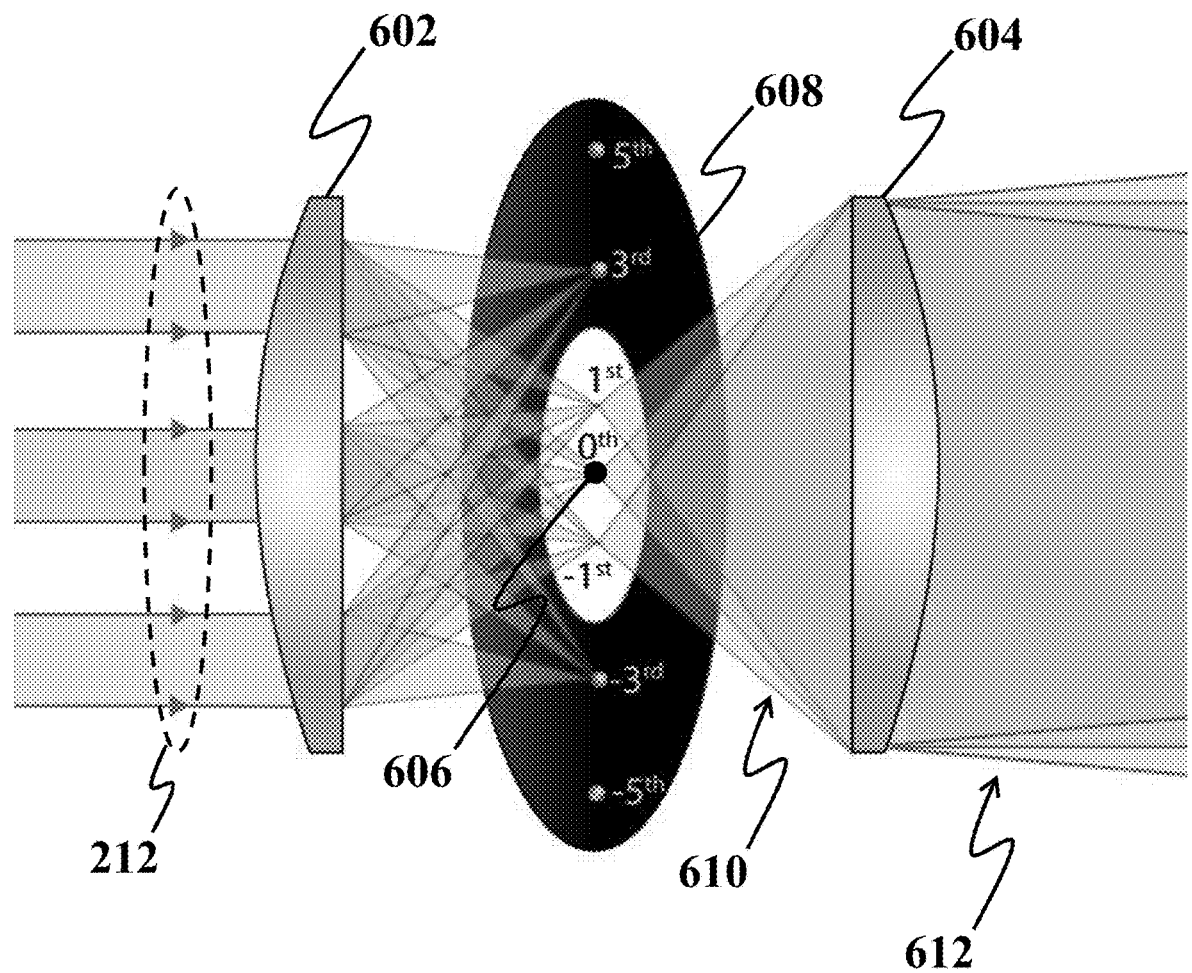
FIG. 6 shows a schematic of an optical filter, consistent with one or more exemplary embodiments of the present disclosure.

In further detail regarding step 130, FIG. 6 shows a schematic of an optical filter, consistent with one or more exemplary embodiments of the present disclosure. In an exemplary embodiment, optical filter 502 may include a third optical lens 602 and a fourth optical lens 604. In an exemplary embodiment, third optical lens 602 may converge plurality of modulated light beams 212 at a third focal point 606 of third optical lens 602 in step 130.

Referring to FIGS. 1E, 5, and 6, in an exemplary embodiment, optical filter 502 may further include a pinhole 608. In an exemplary embodiment, plurality of modulated light beams 212 may be passed through pinhole 608 in step 132 to filter high-order spatial frequencies of plurality of modulated light beams 212. For this purpose, in an exemplary embodiment, pinhole 608 may be placed at a common focal point of third optical lens 602 and fourth optical lens 604. Therefore, fourth optical lens 604 may be placed such that an exemplary fourth focal point of fourth optical lens 604 may coincide with third focal point 606 where pinhole 608 may be placed. In order to filter out $3^{rd}$ order frequency components of plurality of modulated light beams 212 and keep $0^{th}$ and $\pm 1^{st}$ diffraction order components of plurality of modulated light beams 212, an exemplary radius $r_p$ of pinhole 608 may be set equal to a second order spatial frequency component of plurality of SSF patterns 506 according to an operation defined by the following:

$$r_p = \lambda f_{L3} \times (2 f_{SSF}) \frac{f_{L4}}{f_{L3}} \quad \text{Equation (1)}$$

where $\lambda$ is a wavelength of plurality of SSF patterns 506, $f_{L3}$ is a focal length of third optical lens 602 (i.e., a distance between third optical lens 602 and third focal point 606), $f_{L4}$ is a focal length of fourth optical lens 604 (i.e., a distance between fourth optical lens 604 and an exemplary fourth focal point of fourth optical lens 604 that coincides with third focal point 606), and $f_{SSF}$ is a frequency of plurality of SSF patterns 506 that is given by $f_{SSF} = 2\pi f_{L3}/f_{L4}$.

In an exemplary embodiment, step 134 may include collimating plurality of diverging light beams 610 from third focal point 606. For this purpose, an exemplary fourth focal point of fourth optical lens 604 may be placed at third focal point 606 so that plurality of diverging light beams 610 may be emitted to fourth optical lens 604 from third focal point 606. As a result, exemplary collimated beams 612 that include $0^{th}$ and $\pm 1^{st}$ diffraction order components of plurality of modulated light beams 212 may shrink in width (up to about 1.7) compared to plurality of modulated light beams 212, which may lead to improvement in the signal to noise ratio (SNR) of plurality of SSF patterns 506.

Due to the filtering effect of pinhole 608, in an exemplary embodiment, only the zero-order frequency, DC, and ±1 order frequency components of plurality of modulated light beams 212 may pass through pinhole 608. Therefore, after passage through setup 500, plurality of SSF patterns 506 may consist of a normal propagating plane-wave and two inclined plane-waves $E^+$ and $E^-$ corresponding to the +1 order frequency component and −1 order frequency component, respectively. In an exemplary embodiment, inclined plane-waves $E^+$ and $E^-$ may propagate in an inclined direction with respect to the normal direction and may be determined according to an operation defined by the following:

$$E^+ = \frac{1}{\pi} \exp[i(k_{x_1} x + k_{y_1} y + k_z z + \varphi)] \quad \text{Equation (2a)}$$

$$E^- = \frac{1}{\pi} \exp[i(-k_{x_1} x - k_{y_1} y + k_z z - \varphi)] \quad \text{Equation (2b)}$$

where i is the unit imaginary number, x, y, and z are horizontal, vertical, and axial coordinates, respectively, in a Cartesian coordinate system, $k_z$ is a spatial angular frequency of the propagating plane-waves, and $\varphi$ is phase shift 405 that may be applied through shifting PSP 400 on DMD 202. Variables $k_{x_1}$ and $k_{y_1}$ are spatial frequencies of plurality of SSF patterns 506 which are determined through orientation 404 according to the following:

$$k_{x_1} = 2\pi f_{SSF} \cos(\theta) = 2\pi \frac{f_{L3}}{f_{L4}} f_{PSP} \cos(\theta) \quad \text{Equation (3a)}$$

$$k_{y_1} = 2\pi f_{SSF} \sin(\theta) = 2\pi \frac{f_{L3}}{f_{L4}} f_{PSP} \sin(\theta) \quad \text{Equation (3b)}$$

where $\theta$ and $f_{PSP}$ represent orientation 404 and spatial frequency 406, respectively.

Based on Equations (2a) and (2b), in an exemplary embodiment, an interference $E_{SSF}$ of a normal propagating plane-wave $E^{dc}$ and two inclined plane-waves $E^+$ and $E^-$ may become as follows:

$$E_{SSF} = E^{dc} + E^+ + E^-$$ Equation (4)

$$= \frac{1}{2}e^{ik_z z} + \frac{1}{\pi}\exp[i(k_{x_1}x + k_{y_1}y + k_z z + \varphi)] + \frac{1}{\pi}\exp[i(-k_{x_1}x - k_{y_1}y + k_z z - \varphi)]$$

$$= e^{ik_z z}\left[\frac{1}{2} + \frac{2}{\pi}\cos(k_{x_1}x + k_{y_1}y + \varphi)\right]$$

According to Equation (4), in an exemplary embodiment, a 3-D profile $I_{SSF}^{\varphi}$ of a produced SSF intensity pattern of plurality of SSF patterns 506 may be represented as:

$$I_{SSF}^{\varphi} = \left[\frac{1}{2} + \frac{2}{\pi}\cos(k_{x_1}x + k_{y_1}y + \varphi)\right]^2$$ Equation (5)

$$= \left(\frac{1}{4} + \frac{2}{\pi^2}\right) + \frac{2}{\pi}\cos[k_{x_1}x + k_{y_1}y + \varphi] + \frac{2}{\pi^2}\cos[2k_{x_1}x + 2k_{y_1}y + 2\varphi]$$

Referring again to FIGS. 1E and 2, in an exemplary embodiment, system 200 may further include a third mirror 222. In an exemplary embodiment, third mirror 222 may reflect plurality of diverging light beams 610 to fourth optical lens 604 in step 134. Using third mirror 222 may increase the precision of beam steering towards fourth optical lens 604 so that imaging quality may be enhanced.

Referring again to FIGS. 1B, 2, and 5, in an exemplary embodiment, step 116 may include emitting each of plurality of SSF patterns 506 to object 208. For this purpose, object 208 may be placed in an exemplary water tank 224 to be excited by plurality of SSF patterns 506 that may be emitted toward object 208 through fourth optical lens 604.

In an exemplary embodiment, object 208 may be further excited by a normal illumination (NI) by laser beam 210 in step 117. For this purpose, in an exemplary embodiment, all micromirrors of DMD 202 may be set to the "on" state so that expanded laser beam 310 may be entirely reflected to object 208.

Referring again to FIGS. 1A, 2, and 4, step 104 may include receiving an exemplary plurality of acoustic waves that are propagated from object 208. Each exemplary acoustic wave may be generated in response to optically exciting object 208 in step 102, as discussed above. Therefore, each exemplary acoustic wave may be generated in response to optically exciting object 208 at a specific orientation (for example, orientation 404) and a specific phase shift (for example, phase shift 405). An exemplary acoustic wave may also be generated due to a normal illumination of object 208 by laser beam 210, as discussed in step 117 above. In an exemplary embodiment, a value of an initial local pressure $p_0(x,y,z)$ of an acoustic wave due to an illumination of a short pulsed light to object 208 may be expressed through the following: $p_0(x,y,z) = \eta \Gamma \mu_\alpha(x,y,z)\psi(x,y,z)$ Equation (6)

where η is the heat conversion efficiency, Γ is the Gruneisen parameter, $\mu_\alpha(x,y,z)$ is an optical absorption distribution of object 208, and ψ(x,y,z) is an optical fluence (i.e., optical energy per unit area) of laser illumination at object 208.

In an exemplary embodiment, step 106 may include reconstructing a PA image from an acoustic wave $p_0(x,y,z)$. An exemplary PA image may be reconstructed based on Equations (5) and (6) according to the following:

$$P_0^{\varphi}(k_x, k_y, z) = FT_{2D}\{p_0(x, y, z)\}_{x,y} =$$ Equation (7)

$$\eta\Gamma[M_a(k_x, k_y, z) \otimes I_{SSF}^{\varphi}(k_x, k_y)] = \eta\Gamma\left[\left(\frac{1}{4} + \frac{2}{\pi^2}\right)M_a(k_x, k_y, z) + \frac{e^{i\varphi}}{\pi}M_a(k_x - k_{x_1}, k_y - k_{y_1}, z) + \frac{e^{-i\varphi}}{\pi}M_a(k_x + k_{x_1}, k_y + k_{y_1}, z) + \frac{e^{i2\varphi}}{\pi^2}M_a(k_x - 2k_{x_1}, k_y - 2k_{y_1}, z) + \frac{e^{-i2\varphi}}{\pi^2}M_a(k_x + 2k_{x_1}, k_y + 2k_{y_1}, z)\right]$$

where $P_0^{\varphi}(k_x,k_y,z)$ is a value of an exemplary PA image in a wavenumber (i.e., spatial frequency) domain $(k_x,k_y)$ that is reconstructed from an acoustic wave produced at a depth z of object 208 in response to emitting an exemplary SSF pattern to object 208 that is generated from PSP 400 at orientation θ and phase shift φ, $FT_{2D}\{\cdot\}_{x,y}$ is a two dimensional (2-D) Fourier transform from spatial domain (x,y) to spatial frequency domain $(k_x,k_y)$, $M_\alpha(k_x,k_y,z)$ is the wavenumber domain representation of optical absorption distribution $\mu_\alpha(x,y,z)$, and ⊗ is the convolution operator.

According to Equations (5) and (7), illumination of object 208 by an exemplary SSF pattern may cause the spatial frequency spectrum of object 208 to become downshifted and upshifted with $[k_{x_1}, k_{y_1}]$ and $[2k_{x_1}, 2k_{y_1}]$. Therefore, the interference of exemplary low-frequency and high-frequency components of object 208 may be passed through UST 204 passband of spatial impulse response. In order to separate an exemplary high-frequency content of object 208, three exemplary PA images with 0, π/2, and π phase shifts may be captured for orientation θ. Then, for each axial cross-section, an exemplary combination of the three images may be obtained for each value of orientation 404, as described in detail below.

Figure 1F:
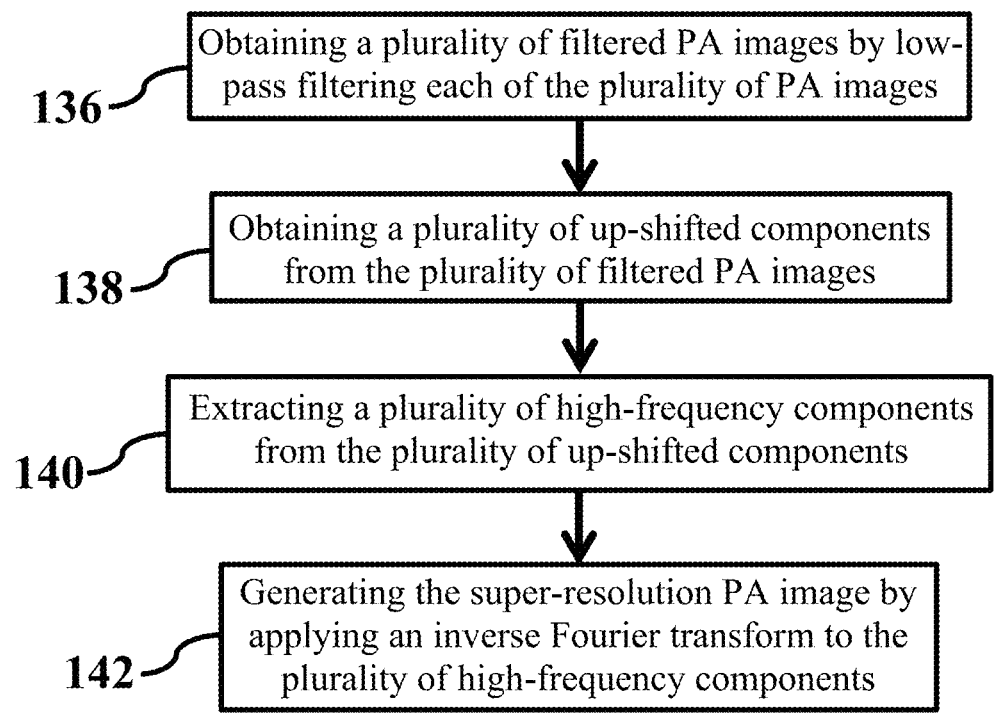
FIG. 1F shows a flowchart for applying a frequency domain reconstruction method to a plurality of photoacoustic (PA) images, consistent with one or more exemplary embodiments of the present disclosure.

In further detail regarding step 108, FIG. 1F shows a flowchart for applying a frequency domain reconstruction method to a plurality of PA images, consistent with one or more exemplary embodiments of the present disclosure. In an exemplary embodiment, applying the frequency domain reconstruction method in step 108 may include obtaining a plurality of filtered PA images by low-pass filtering each of the plurality of PA images (step 136), obtaining a plurality of down-shifted components from the plurality of filtered PA images by applying a phase compounding method to the plurality of filtered PA images (step 138), extracting a plurality of high-frequency components from the plurality of down-shifted components by high-pass filtering the plurality of down-shifted components (step 140), and generating the super-resolution PA image by applying an inverse Fourier transform to the plurality of high-frequency components (step 142).

For further detail with respect to step 136, in an exemplary embodiment, frequency components of the plurality of PA images that are out of a diffraction limit (i.e., a limit out of which PA signals are diffracted) may be lower than the noise level of system 200 and thus may be invalid. Therefore, in an exemplary embodiment, each of the plurality of PA images may be passed through a low-pass filter. A cut-off frequency of an exemplary low-pass filter may be set equal to a spatial spectral bandwidth of UST 204 in FIG. 2. As a result, invalid high-frequency values may be removed from the plurality of PA images.

In further detail with regards to step 138, in an exemplary embodiment, the plurality of down-shifted components may be obtained from the plurality of filtered PA images by applying the phase compounding method to the plurality of filtered PA images. In an exemplary embodiment, applying the phase compounding method to the plurality of filtered PA images may include calculating a first down-shifted component of the plurality of down-shifted components. An exemplary first down-shifted component $\hat{M}_\alpha(k_x-k_{x_1}, k_y-k_{y_1}, z)$ may include an estimated value of absorption distribution spectrum $M_\alpha(k_x, k_y, z)$ down-shifted by a spatial frequency pair $(k_{x_1}, k_{y_1})$ at orientation θ, as shown in Equations (3a) and (3b) above. In an exemplary embodiment, first down-shifted component $\hat{M}_\alpha(k_x-k_{x_1}, k_y-k_{y_1}, z)$ may be calculated according to an operation defined by the following:

$$\hat{M}_\alpha(k_x - k_{x_1}, k_y - k_{y_1}, z) = \frac{\pi}{4\eta\Gamma}\Bigg[\left(\hat{P}_0^0(k_x, k_y, z) - \hat{P}_0^\pi(k_x, k_y, z)\right) + i\left(\left[1 + \frac{8}{\pi^2}\right]\hat{P}_0^{NI}(k_x, k_y, z) - \hat{P}_0^0(k_x, k_y, z) - 2\hat{P}_0^{\pi/2}(k_x, k_y, z) - \hat{P}_0^\pi(k_x, k_y, z)\right)\Bigg]$$

Equation (8)

where $\hat{P}_0^{NI}(k_x, k_y, z)$ is a representation of an exemplary PA image in wavenumber domain $(k_x, k_y)$ that is reconstructed by UST 204 from an acoustic wave produced at depth z of object 208 due to normal illumination of object 208 by laser beam 210 through reflecting laser beam 310 to object 208 by DMD 202 and $\hat{P}_0^{\varphi_0}(k_x, k_y, z)$ is a representation of an exemplary PA image in wavenumber domain $(k_x, k_y)$ that is reconstructed by UST 204 from an acoustic wave produced at depth z of object 208 in response to emitting an exemplary SSF pattern to object 208 that is generated from PSP 400 at orientation θ and phase shift $\varphi_0$. In an exemplary embodiment, representations $\hat{P}_0^{NI}(k_x, k_y, z)$ and $\hat{P}_0^{\varphi_0}(k_x, k_y, z)$ may be obtained as follows:

$$\hat{P}_0^{NI}(k_x, k_y, z) = P_0^{NI}(k_x, k_y, z) \cdot PSF(k_x, k_y) \quad \text{Equation (9a)}$$

$$\hat{P}_0^{\varphi_0}(k_x, k_y, z) = P_0^{\varphi_0}(k_x, k_y, z) \cdot PSF(k_x, k_y) \quad \text{Equation (9b)}$$

where $P_0^{NI}(k_x, k_y, z)$ is an exemplary representation of a PA image in wavenumber domain $(k_x, k_y)$ that is reconstructed from an acoustic wave generated due to normal illumination of object 208 (discussed in step 117 above) and $PSF(k_x, k_y)$ is a frequency domain representation of a point spread function (PSF) of UST 204. An exemplary value of $P_0^{\varphi_0}(k_x, k_y, z)$ may be obtained from Equation (7) for $\varphi=\varphi_0$.

Referring again to FIGS. 1A, 1B, and 4, to obtain all exemplary values of PA images that are compounded in Equation (8), step 102 may be repeated for phase shift 405 values equal to 0, π/2, and π. In an exemplary embodiment, orientation 404 may be set to 0 during the repetitions of step 102 so that first down-shifted component $\hat{M}_\alpha(k_x-k_{x_1}, k_y-k_{y_1}, z)$ may correspond to a single orientation θ.

Considering the symmetry of absorption distribution spectrum $M_\alpha(k_x, k_y, z)$ in the Fourier domain, an exemplary second down-shifted component of the plurality of down-shifted components may be calculated at an orientation π+θ of the plurality of orientations by flipping and conjugating of first down-shifted component $\hat{M}_\alpha(k_x-k_{x_1}, k_y-k_{y_1}, z)$. Therefore, in an exemplary embodiment, step 102 may be repeated for orientation 404 values equal to 0, π/4, π/2, and 3π/4, and may be followed by subsequent steps to obtain values of first down-shifted component $\hat{M}_\alpha(k_x-k_{x_1}, k_y-k_{y_1}, z)$ for each respective orientation in step 138 using Equation (8). Afterwards, exemplary values of second down-shifted component may be obtained for orientation 404 values equal to π, 5π/4, 3π/2, and 7π/4 by flipping and conjugating of first down-shifted component $\hat{M}_\alpha(k_x-k_{x_1}, k_y-k_{y_1}, z)$ obtained for orientation 404 values of 0, π/4, π/2, and 3π/4, respectively.

For further detail with respect to step 140, in an exemplary embodiment, high-frequency components of reconstructed PA images obtained for different orientation 404 values described above may overlap low-frequency components of NI reconstruction in Equation (8), causing disturbance in estimated low-frequency values of first down-shifted component $\hat{M}_\alpha(k_x-k_{x_1}, k_y-k_{y_1}, z)$. Therefore, in an exemplary embodiment, each of the plurality of down-shifted components (for example, the first down-shifted component and the second down-shifted component) may be passed through a high-pass filter. A cut-off frequency of an exemplary high-pass filter may be set equal to a spatial spectral bandwidth of UST 204 in FIG. 2. As a result, invalid low-frequency values may be removed from the plurality of down-shifted components.

In further detail with regarding step 142, to generate an exemplary super-resolution PA image, the plurality of high-frequency components that may be obtained at different orientations in steps 136-140 may be combined as a single image in spatial frequency domain $(k_x, k_y)$. An exemplary super-resolution PA image may then be generated by applying an inverse Fourier transform to the frequency-domain image. In an exemplary embodiment, the abovementioned process may be performed for different depths of object 208 (i.e., along the z axis) to obtain a three-dimensional (3-D) image of object 208.

Figure 7:
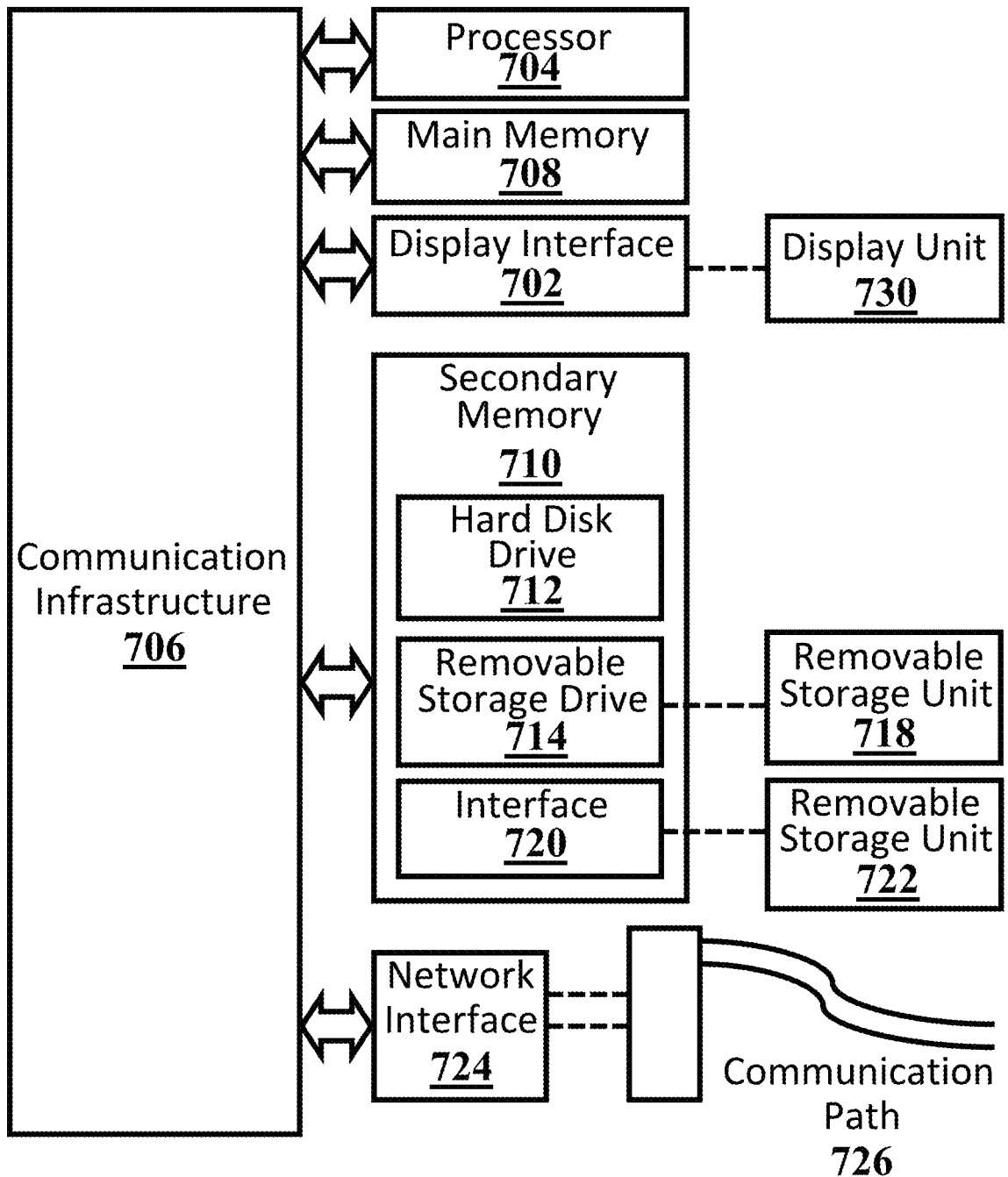
FIG. 7 shows a high-level functional block diagram of a computer system, consistent with one or more exemplary embodiments of the present disclosure.

FIG. 7 shows an example computer system 700 in which an embodiment of the present invention, or portions thereof, may be implemented as computer-readable code, consistent with exemplary embodiments of the present disclosure. For example, different steps of method 100 may be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-2, for example, processor 206 in FIG. 2.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 704 may be a special purpose (e.g., a graphical processing unit) or a general-purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 may be connected to a communication infrastructure 706, for example, a bus, message queue, network, or multi-core message-passing scheme.

In an exemplary embodiment, computer system 700 may include a display interface 702, for example a video connector, to transfer data to a display unit 730, for example, a monitor. Computer system 700 may also include a main memory 708, for example, random access memory (RAM), and may also include a secondary memory 710. Secondary memory 710 may include, for example, a hard disk drive 712, and a removable storage drive 714. Removable storage drive 714 may include a floppy disk drive, a magnetic tape drive, an optical disk drive, a flash memory, or the like. Removable storage drive 714 may read from and/or write to a removable storage unit 718 in a well-known manner. Removable storage unit 718 may include a floppy disk, a magnetic tape, an optical disk, etc., which may be read by and written to by removable storage drive 714. As will be appreciated by persons skilled in the relevant art, removable storage unit 718 may include a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement different embodiments of the present disclosure as discussed herein. In particular, the computer programs, when executed, enable processor device 704 to implement the processes of the present disclosure, such as the operations in method 100 illustrated by flowcharts of FIGS. 1A-FIG. 1F discussed above. Accordingly, such computer programs represent controllers of computer system 700. Where an exemplary embodiment of method 100 is implemented using software, the software may be stored in a computer program product and loaded into computer system 700 using removable storage drive 714, interface 720, and hard disk drive 712, or communications interface 724.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Example 1

Figure 8A:
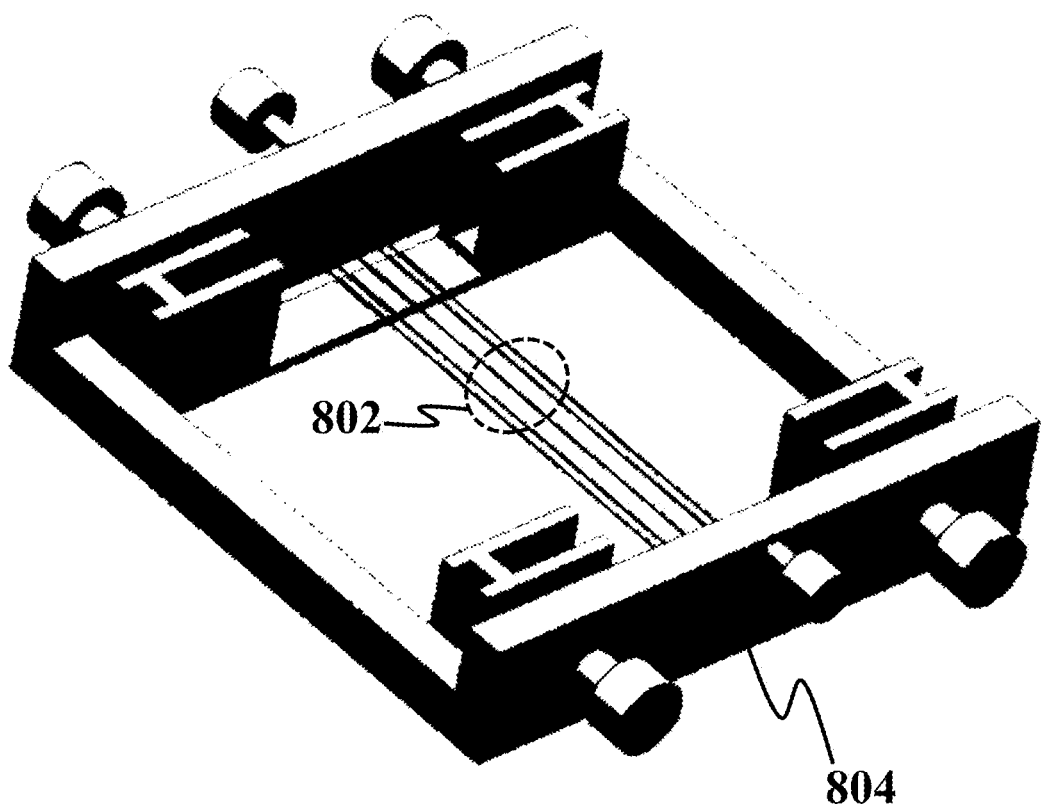
FIG. 8A shows a fabricated holder via a three dimensional (3-D) printer for five filaments located at depths of ±600 μm, ±450 μm, and 0 with respect to a focal plane, consistent with one or more exemplary embodiments of the present disclosure.
Figure 8B:
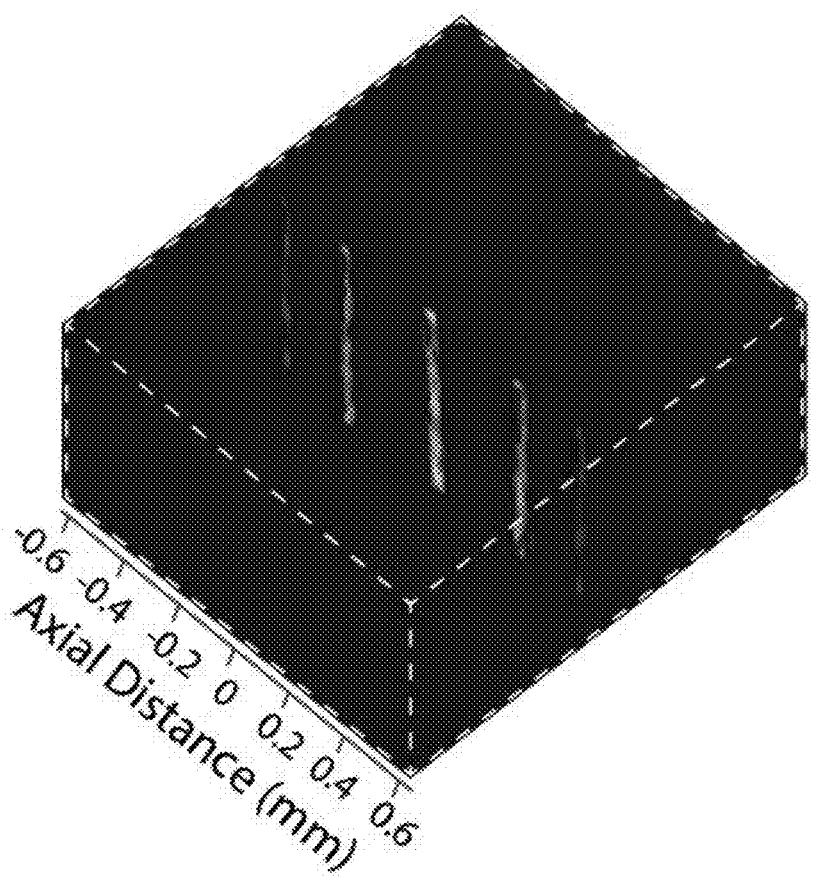
FIG. 8B shows a reconstruction result of imaging five filaments, consistent with one or more exemplary embodiments of the present disclosure.

In this example, lateral resolution of an implementation of method 100 in an axial imaging range is evaluated. FIG. 8A shows a fabricated holder via a 3-D printer for five filaments located at depths of about ±600 µm, ±450 µm, and 0 with respect to a focal plane, consistent with one or more exemplary embodiments of the present disclosure. Five tungsten filaments 802 of an about 15 µm diameter placed in different depths of a water tank (similar to water tank 224 in system 200) are used as an imaging target (analogous to object 208 in FIG. 2). An exemplary holder 804 is built using a 3-D printer to place the five filaments in about 0, ±450 µm, and ±600 µm axial distances with respect to a focal plane of a UST (similar to UST 204 in system 200). FIG. 8B shows a reconstruction result 806 of an implementation of method 100 for imaging five filaments, consistent with one or more exemplary embodiments of the present disclosure. Given that the used UST with about 50 MHz center frequency along with about 0.5 numerical aperture (NA) acoustic lens has an about 300 µm depth of focus (DOF), the 4 filaments placed at about ±450 µm and ±600 µm depths may be in an out-of-focus region. Therefore, as shown in FIG. 8B, a resolution degradation and an appearance of arc shapes are visible for the out-of-focused filaments.

Example 2

Figure 9A:
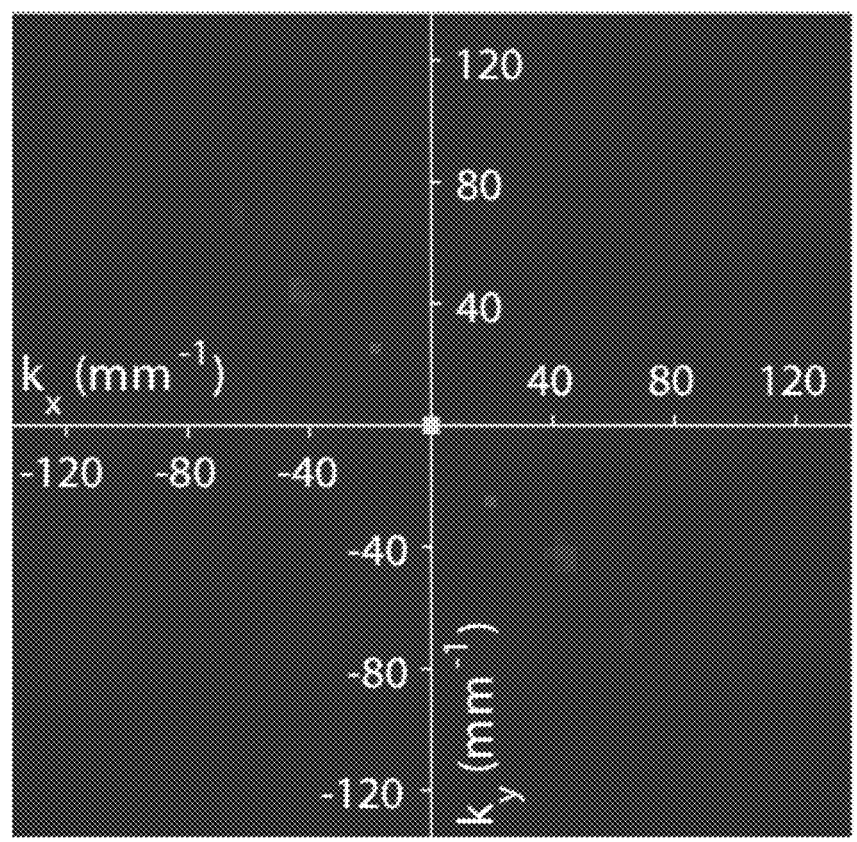
FIG. 9A shows a Fourier-domain image of a Ronchi-ruling test target obtained from an implementation of a super-resolution photoacoustic microscopy with an about 135° orientation and 0° shifting phase, consistent with one or more exemplary embodiments of the present disclosure.

In this example, the performance of an implementation of method 100 for imaging a Ronchi-ruling test target with a spatial frequency of about 15 lp/mm and an about 135° orientation is demonstrated. The Ronchi-ruling test target is used as an imaging target (analogous to object 208 in FIG. 2) and is placed in a focal zone of a UST (similar to UST 204 in system 200). The test target contains DC frequency components and also odd multiplications of about 94.2 $mm^{-1}$ spatial frequency. An exemplary SSF pattern (analogous to each of plurality of SSF patterns 506 in FIG. 5) contains DC, about ±62.8 $mm^{-1}$, and about ±125.6 $mm^{-1}$ frequency components. FIG. 9A shows a Fourier-domain image 902 of a Ronchi-ruling test target obtained from an implementation of method 100 with an about 135° orientation (analogous to orientation 404 in FIG. 4) and 0° shifting phase (analogous to phase shift 405 in FIG. 4), consistent with one or more exemplary embodiments of the present disclosure.

Figure 9B:
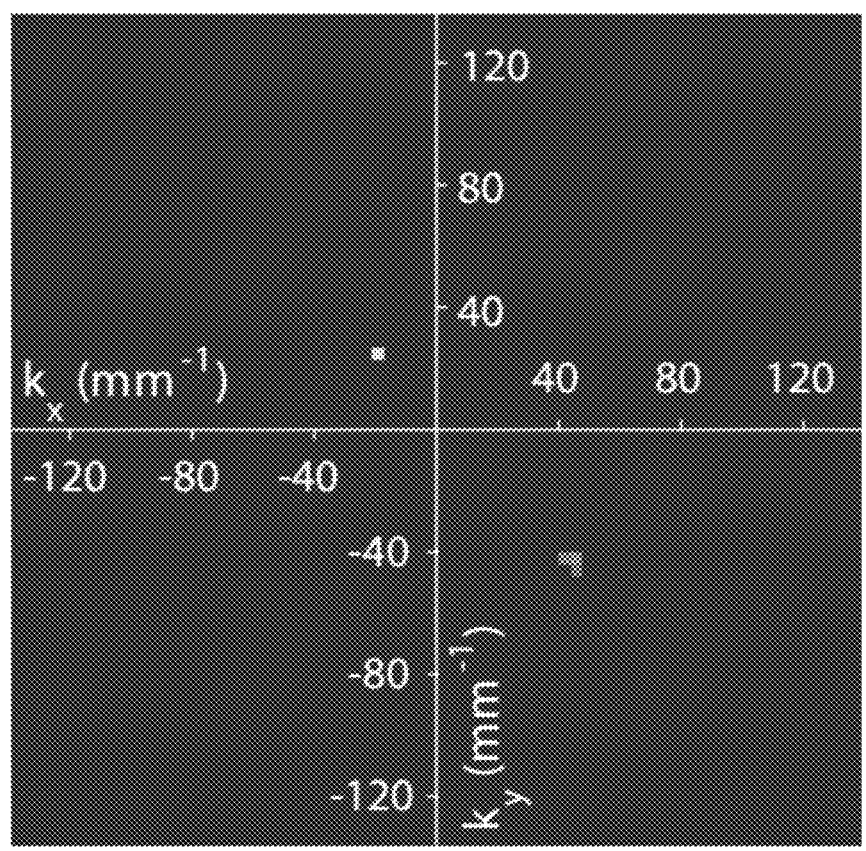
FIG. 9B shows a down-shifted frequency content of a Ronchi-ruling test target in a Fourier domain obtained from phase compounding, consistent with one or more exemplary embodiments of the present disclosure.

In order to image the down-shifted frequency content of the Ronchi-ruling test target, an implementation of the phase compounding method in step 138 of method 100 may be applied to three exemplary obtained images resulted from illuminations of an about 135° oriented pattern at about 0°, 90°, and 180° phase shifts. FIG. 9B shows an down-shifted frequency content of a Ronchi-ruling test target in a Fourier domain obtained from phase compounding, consistent with one or more exemplary embodiments of the present disclosure. An exemplary upshifted frequency content 904 of the test target with a frequency shift of about ±62.8 $mm^{-1}$ is observable in the transducer passband.

Figure 9C:
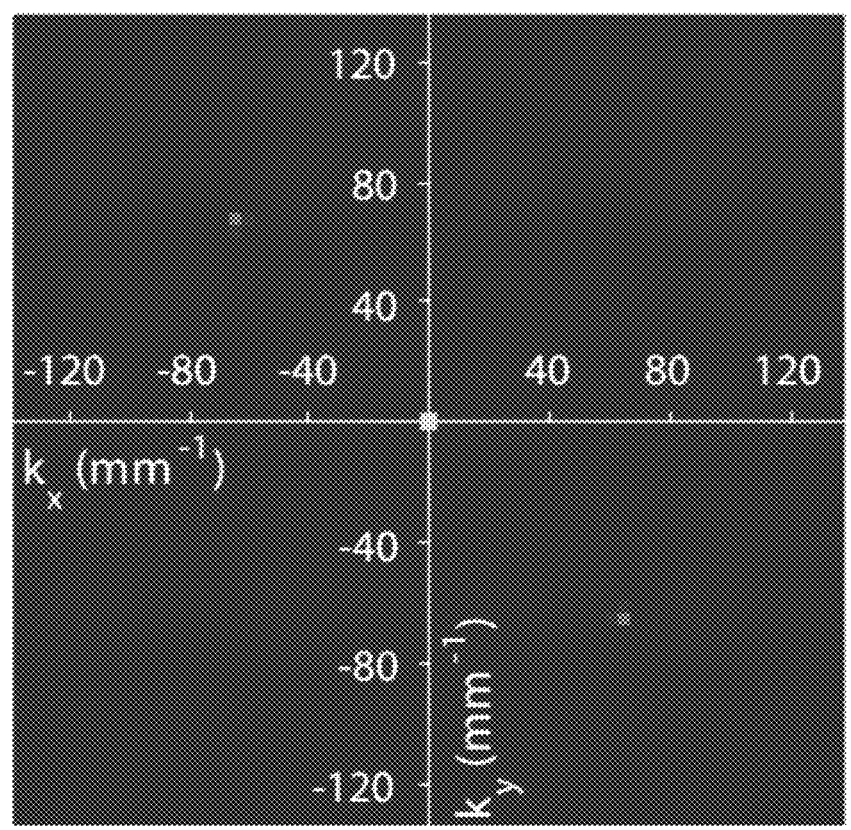
FIG. 9C shows a wide-band image of a Ronchi-ruling test target in a spatial domain, consistent with one or more exemplary embodiments of the present disclosure.
Figure 9D:
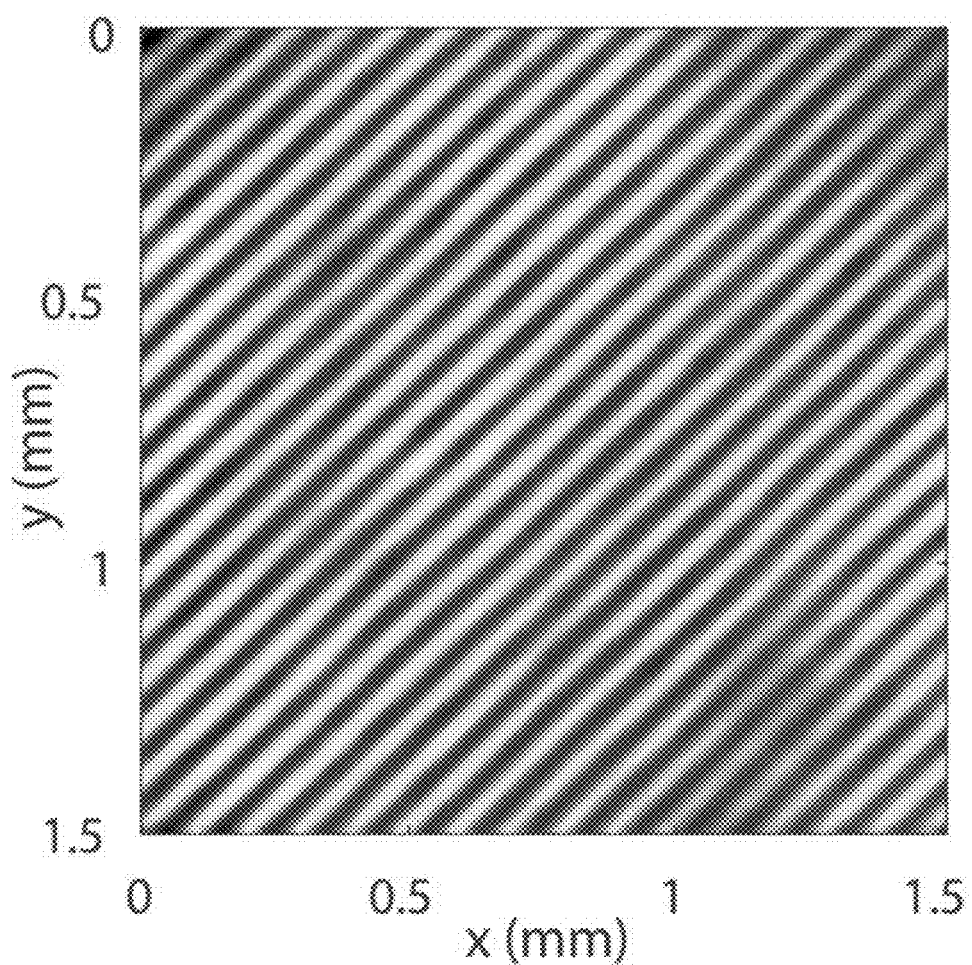
FIG. 9D shows a super-resolution PA image of a Ronchi-ruling test target in a frequency domain obtained via an inverse Fourier transformation of a wide-band image, consistent with one or more exemplary embodiments of the present disclosure.

FIG. 9C shows a wide-band image of a Ronchi-ruling test target in a frequency domain, consistent with one or more exemplary embodiments of the present disclosure. An exemplary wide-band image 906 may be obtained by combining the obtained high-frequency and low-frequency contents of the Ronchi-ruling test target in the frequency domain, as discussed above in step 142. FIG. 9D shows a super-resolution PA image 908 of a Ronchi-ruling test target in a frequency domain obtained via an inverse Fourier transformation of wide-band image 906, consistent with one or more exemplary embodiments of the present disclosure.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for super-resolution photoacoustic microscopy of an object, the method comprising:
   emitting a laser beam to a digital micromirror device (DMD) utilizing a laser;
   generating a plurality of modulated light beams from the laser beam by producing each of a plurality of periodic square patterns (PSPs) at a respective orientation of a plurality of orientations and a respective phase shift of a plurality of phase shifts via the DMD;
   generating a plurality of sinusoidal spatial fringe (SSF) patterns from the plurality of PSPs by filtering the plurality of modulated light beams utilizing an optical filter;
   optically exciting the object by:
      emitting each of the plurality of SSF patterns to the object; and
      reflecting the laser beam to the object by the DMD;
   receiving, utilizing an ultrasound transducer (UST), a plurality of acoustic waves propagated from the object due to optically exciting the object, each of the plurality of acoustic waves associated with a respective orientation of a plurality of orientations and a respective phase shift of a plurality of phase shifts;
   reconstructing, utilizing one or more processors, each of a plurality of photoacoustic (PA) images from a respective acoustic wave of the plurality of acoustic waves;
   obtaining, utilizing the one or more processors, a plurality of filtered PA images by passing each of the plurality of PA images through a low-pass filter of a first cut-off frequency equal to a spatial spectral bandwidth of the UST;
   obtaining, utilizing the one or more processors, a plurality of down-shifted components from the plurality of filtered PA images by:
      calculating a first down-shifted component $\hat{M}_a(k_x-k_{x_1}, k_y-k_{y_1}, z)$ of the plurality of down-shifted components at an orientation $\theta$ of the plurality of orientations according to an operation defined by the following:

$$\hat{M}_a(k_x-k_{x_1}, k_y-k_{y_1}, z) = \frac{\pi}{4\eta\Gamma}\left[\left(\hat{P}_0^{\,0}(k_x, k_y, z) - \hat{P}_0^{\,\pi}(k_x, k_y, z)\right) + i\left(\left[1 + \frac{8}{\pi^2}\right]\hat{P}_0^{\,NI}(k_x, k_y, z) - \hat{P}_0^{\,0}(k_x, k_y, z) - 2\hat{P}_0^{\,\pi/2}(k_x, k_y, z) - \hat{P}_0^{\,\pi}(k_x, k_y, z)\right)\right]$$

where:
   $\hat{P}_0^{\,NI}(k_x,k_y,z)$ is a representation of a respective PA image of the plurality of PA images in a wavenumber domain $(k_x,k_y)$ that is reconstructed, utilizing the UST, from a respective acoustic wave of the plurality of acoustic waves that is generated at a depth z of the object due to reflecting the laser beam to the object by the DMD, $\hat{P}_0^{\,\varphi_0}(k_x,k_y,z)$ is a representation of a respective PA image of the plurality of PA images in the wavenumber domain $(k_x,k_y)$ where the respective PA image is reconstructed, utilizing the UST, from a respective acoustic wave of the plurality of acoustic waves that is generated at the depth z of the object due to emitting a respective SSF pattern of the plurality of SSF patterns to the object, wherein the respective SSF pattern is generated from a respective PSP of the plurality of PSPs that is produced at the orientation $\theta$ and a phase shift $\varphi_0$ of the plurality of phase shifts, $\eta$ is a heat conversion efficiency of the object,
   $\Gamma$ is the Gruneisen parameter,
   i is the imaginary unit, and
   $k_{x_1}$, $k_{y_1}$ are spatial frequencies of the respective SSF pattern given by:

$$k_{x_1}=2\pi f_{SSF}\cos(\theta), \text{ and}$$

$$k_{y_1}=2\pi f_{SSF}\sin(\theta),$$

where $f_{SSF}$ is a frequency of the plurality of SSF patterns; and
   calculating a second down-shifted component of the plurality of down-shifted components at an orientation $\pi+\theta$ of the plurality of orientations by flipping and conjugating of the first down-shifted component;
   extracting, utilizing the one or more processors, a plurality of high-frequency components from the plurality of down-shifted components by passing the plurality of down-shifted components through a high-pass filter of a second cut-off frequency equal to the spatial spectral bandwidth of the UST; and
   generating, utilizing the one or more processors, a super-resolution PA image of the object by applying an inverse Fourier transform to the plurality of high-frequency components.

2. A method for super-resolution photoacoustic microscopy of an object, the method comprising:
   optically exciting the object according to a plurality of excitation patterns utilizing a digital micromirror device (DMD), each of the plurality of excitation patterns associated with a respective orientation of a plurality of orientations and a respective phase shift of a plurality of phase shifts;
   receiving, utilizing an ultrasound transducer (UST), a plurality of acoustic waves propagated from the object due to optically exciting the object, each of the plurality of acoustic waves associated with a respective excitation pattern of the plurality of excitation patterns; and
   reconstructing, utilizing one or more processors, each of a plurality of photoacoustic (PA) images from a respective acoustic wave of the plurality of acoustic waves; and
   obtaining, utilizing the one or more processors, a super-resolution PA image of the object from the plurality of PA images by applying a frequency domain reconstruction method to the plurality of PA images.

3. The method of claim 2, wherein optically exciting the object comprises:
   emitting a laser beam to the DMD utilizing a laser;
   generating a plurality of modulated light beams from the laser beam by producing a plurality of periodic square patterns (PSPs) via the DMD, each of the plurality of PSPs comprising a respective orientation of the plurality of orientations and a respective phase shift of the plurality of phase shifts;

generating a plurality of sinusoidal spatial fringe (SSF) patterns from the plurality of PSPs by filtering the plurality of modulated light beams utilizing an optical filter; and exciting the object by emitting each of the plurality of SSF patterns to the object.

4. The method of claim 3, wherein producing the plurality of PSPs comprises producing each of the plurality of PSPs at a respective orientation of the plurality of orientations and a respective phase shift of the plurality of phase shifts.

5. The method of claim 4, wherein optically exciting the object further comprises reflecting the laser beam to the object by the DMD.

6. The method of claim 5, wherein applying the frequency domain reconstruction method comprises:
obtaining a plurality of filtered PA images by low-pass filtering each of the plurality of PA images;
obtaining a plurality of down-shifted components from the plurality of filtered PA images by applying a phase compounding method to the plurality of filtered PA images, each of the plurality of down-shifted components associated with a respective orientation of the plurality of orientations;
extracting a plurality of high-frequency components from the plurality of down-shifted components by high-pass filtering the plurality of down-shifted components; and
generating the super-resolution PA image by applying an inverse Fourier transform to the plurality of high-frequency components.

7. The method of claim 6, wherein low-pass filtering each of the plurality of PA images comprises passing each of the plurality of PA images through a low-pass filter of a cut-off frequency equal to a spatial spectral bandwidth of the UST.

8. The method of claim 6, wherein applying the phase compounding method to the plurality of filtered PA images comprises:
calculating a first down-shifted component $\hat{M}_\alpha(k_x-k_{x_1},k_y-k_{y_1},z)$ of the plurality of down-shifted components at an orientation $\theta$ of the plurality of orientations according to an operation defined by the following:

$$\hat{M}_a(k_x - k_{x_1}, k_y - k_{y_1}, z) = \frac{\pi}{4\eta\Gamma}\left[\left(\hat{P}_0^{\,0}(k_x, k_y, z) - \hat{P}_0^{\,\pi}(k_x, k_y, z)\right) + i\left(\left[1 + \frac{8}{\pi^2}\right]\hat{P}_0^{\,NI}(k_x, k_y, z) - \hat{P}_0^{\,0}(k_x, k_y, z) - 2\hat{P}_0^{\,\pi/2}(k_x, k_y, z) - \hat{P}_0^{\,\pi}(k_x, k_y, z)\right)\right]$$

where:
$\hat{P}_0^{NI}(k_x,k_y,z)$ is a representation of a respective PA image of the plurality of PA images in a wavenumber domain $(k_x,k_y)$ that is reconstructed, utilizing the UST, from a respective acoustic wave of the plurality of acoustic waves that is generated at a depth z of the object due to reflecting the laser beam to the object by the DMD,
$\hat{P}_0^{\varphi_0}(k_x,k_y,z)$ is a representation of a respective PA image of the plurality of PA images in the wavenumber domain $(k_x,k_y)$ where the respective PA image is reconstructed, utilizing the UST, from a respective acoustic wave of the plurality of acoustic waves that is generated at the depth z of the object due to emitting a respective SSF pattern of the plurality of SSF patterns to the object, wherein the respective SSF pattern is generated from a respective PSP of the plurality of PSPs that is produced at the orientation $\theta$ and a phase shift $\varphi_0$ of the plurality of phase shifts,
$\eta$ is a heat conversion efficiency of the object,
$\Gamma$ is the Gruneisen parameter,
i is the imaginary unit, and
$k_{x_1}$, $k_{y_1}$ are spatial frequencies of the respective SSF pattern given by:

$k_{x_1}=2\pi f_{SSF}\cos(\theta)$, and $k_{y_1}=2\pi f_{SSF}\sin(\theta)$, where $f_{SSF}$ is a frequency of the plurality of SSF patterns; and
calculating a second down-shifted component of the plurality of down-shifted components at an orientation $\pi+\theta$ of the plurality of orientations by flipping and conjugating of the first down-shifted component.

9. The method of claim 6, wherein high-pass filtering the plurality of down-shifted components comprises passing the plurality of down-shifted components through a high-pass filter of a cut-off frequency equal to a spatial spectral bandwidth of the UST.

10. The method of claim 4, wherein producing each of the plurality of PSPs at a respective orientation of the plurality of orientations comprises setting each of the plurality of orientations to one of 0, $\pi/4$, $\pi/2$, and $3\pi/4$.

11. The method of claim 4, wherein producing each of the plurality of PSPs at a respective phase shift of the plurality of phase shifts comprises shifting each of the plurality of PSPs on the DMD by a phase shift equal to one of 0, $\pi/2$, and $\pi$.

12. The method of claim 3, wherein emitting the laser beam to the DMD comprises:
generating the laser beam by the laser;
reflecting the laser beam to a beam expander by a first mirror;
generating, utilizing the beam expander, an expanded laser beam from the laser beam by expanding a width of the laser beam; and
reflecting the expanded laser beam to the DMD by a second mirror.

13. The method of claim 12, wherein expanding the width of the laser beam comprises:
converging, utilizing a first optical lens, the laser beam at a first focal point of the first optical lens; and
collimating, utilizing a second optical lens, a diverging light beam from the first focal point by placing a second focal point of the second optical lens at the first focal point.

14. The method of claim 3, wherein filtering the plurality of modulated light beams comprises:
converging, utilizing a third optical lens, the plurality of modulated light beams at a third focal point of the third optical lens;
filtering high-order spatial frequencies of the plurality of modulated light beams by passing the plurality of modulated light beams through a pinhole placed at the third focal point; and
collimating, utilizing a fourth optical lens, a plurality of diverging light beams from the third focal point by placing a fourth focal point of the fourth optical lens at the third focal point.

15. The method of claim 14, wherein passing the plurality of modulated light beams through the pinhole comprises setting a radius of the pinhole equal to a second order spatial frequency component of the plurality of SSF patterns according to an operation defined by the following:

$$r_p = \lambda f_{L3} \times (2 f_{SSF}) \frac{f_{L4}}{f_{L3}}$$

where:
- $r_p$ is the radius of the pinhole,
- $\lambda$ is a wavelength of the plurality of SSF patterns,
- $f_{L3}$ is a focal length of the third optical lens,
- $f_{L4}$ is a focal length of the fourth optical lens, and
- $f_{SSF}$ is a frequency of the plurality of SSF patterns given by $f_{SSF} = 2\pi f_{L3}/f_{L4}$.

16. The method of claim 14, wherein collimating the plurality of diverging light beams comprises reflecting the plurality of diverging light beams to the fourth optical lens by a third mirror.

* * * * *